2,957,754

METHOD OF MAKING METAL BORIDES

Kenneth C. Nicholson, Niagara Falls, N.Y., assignor to The Carborundum Company, Niagara Falls, N.Y., a corporation of Delaware No Drawing. Filed Oct. 19, 1951, Ser. No. 252,190

7 Claims. (Cl. 23—204)

This invention relates to a method of making metal borides and raw batch compositions therefor.

The prior art discloses several methods for making metal borides but from a practical standpoint there are objections to all the prior art methods. For example, Moissan has disclosed the making of metal borides in an electric arc furnace, which method is objectionable in that the product obtained contains an undesirable high amount of carbon impurity. Metal borides have also been made by the electrolysis of fused baths but the resulting product is objectionable since it is mixed with various fused bath products extraneous to the desired metal boride and requires an acid treatment to separate the metal boride. Metal borides have also been disclosed as being made by heating a mixture of a metal oxide, boric oxide and carbon. However, such a method requires the use of a large excess of boric oxide due to the volatility of that material and, furthermore, the resulting product is additionally objectionable because of the exceedingly high content of carbon present as an impurity. Laboratory methods for making metal borides have been proposed but require expensive raw materials. Included among such laboratory methods are the heating together of a mixture of a metal and boron and also a method of making metal borides by the vapor deposition of the boride onto a hot wire has been proposed.

It is an object of the present invention to provide an improved method and raw batch compositions for the making of metal borides.

It is also a specific object to provide an improved method for making zirconium boride as well as to provide raw batches for carrying out that improved method.

It is a further object to provide a method and compositions for making metal borides which will obviate certain of the disadvantages found in various prior art methods for making metal borides.

Other objects and advantages will become obvious as the description of the invention proceeds.

I have found that metal borides of such purity that they can be used without special purifying treatment can be made by heating together a metal oxide, boron carbide and carbon. Alternatively, a metal boride of similar high purity can be made by heating together a metal, an oxide of the metal and boron carbide. The mixture of metal oxide, boron carbide and carbon, or, alternatively, the mixture of metal, oxide of the metal and boron carbide, can be heated in the form of a loose mixture in a suitable crucible or container or, if desired, the ingredients can be thoroughly mixed and premolded in the form of a bar, slab, briquette or other shape of desired size and placed in a suitable container and heated to bring about the desired reaction. The reaction is carried out in an atmosphere of helium or other inert gas in order to prevent the formation of nitrides or carbides. The metal boride made according to the present invention is a product which is relatively pure as compared to the products obtained by the various methods heretofore proposed for industrial use and consequently can be used without further purifying treatment.

The invention will be primarily described as it has been applied to the making of zirconium boride. However, it is to be clearly understood that the invention is not limited to the making of zirconium boride but is equally applicable to the making of other metal borides of refractory character or metal borides of extreme hardness.

The following specific examples are illustrative and serve to make clear the various details of the present method.

Example I

Zirconium boride was made from a mixture of zirconium oxide, boron carbide and carbon in the stoichiometric proportions required by the following equation:

$$2ZrO_2 + B_4C + 3C \rightarrow 2ZrB_2 + 4CO$$

The resulting mixture of ingredients percentagewise, percentages by weight being given, was as follows:

| | Percent |
|---|---|
| Zirconium oxide (325 mesh) | 73 |
| Boron carbide (240 mesh) | 16.3 |
| Powdered graphite | 10.7 |

The above mixture was placed in a covered zirconia crucible which was placed in a high frequency electric induction furnace and heated to 2000° C. while maintaining an inert atmosphere in the furnace chamber by flowing a continuous stream of helium through the furnace. The crucible was of slip cast stabilized zirconia previously fired to 1700° C.

The resulting material was a mass of grey, metallic appearing, finely crystalline zirconium boride responding to the chemical formula $ZrB_2$. The material had a relatively low carbon impurity content. The specific gravity of the product from run to run varied somewhat but was usually between 5.5 and 6.1. The material was not attacked by cold hydrochloric acid but was soluble in hot hydrochloric acid. The resulting material can be crushed or pulverized and used alone or with other ingredients for the fabrication of molded refractory or other articles of any desired shape and size. The desired shape or body can be formed by any of the conventional molding procedures and can be hot or cold pressed.

The composition set forth above in Example I has also been used to make zirconium boride by a modified process in which the loose mixture of raw materials is first molded into bars or other forms, the molded shapes are placed in a graphite boat and are embedded in a surrounding mass of uncompacted material of the same composition. The remainder of the process is carried out the same as set forth in Example I. The modified technique offers the added advantage of providing a simpler means of separating the fully converted and reacted molded body of zirconium boride from the surrounding mixture and container and results in a product which is of even higher purity and superior quality than the product obtained by reacting a loose mixture. The reacted bar of material consisting of zirconium boride is crushed or pulverized to the desired grit size whereupon it is ready for use as a hard, refractory material for the making of various shapes or bodies. The higher purity obtained when the raw mix is reacted in the form of premolded shapes embedded in surrounding loose mix of the same composition is due to the fact that in spite of the use of a helium or other inert atmosphere in the furnace any free carbon derived from the furnace tube or other source is absorbed by the loose embedding mixture and does not penetrate to the molded shape. On the other hand, in firing the loose mixture alone any available excess carbon which comes in contact with the loose mixture is absorbed thereby as an impurity.

Example II

Zirconium boride of high purity has also been made by preparing a mixture of zirconium metal powder, zirconium oxide and boron carbide in the stoichiometric proportions required by the following equation:

$$3Zr + ZrO_2 + 2B_4C \rightarrow 4ZrB_2 + 2CO$$

Percentagewise the mixture used was as follows:

| | Percent |
|---|---|
| Powdered zirconia | 24 |
| Zirconium metal powder | 54 |
| Boron carbide (240 mesh) | 22 |

The above mixture was placed in a covered zirconia crucible which was in turn placed in a high frequency electric induction furnace. The crucible was of slip cast stabilized zirconia previously fired to 1700° C. After the furnace was loaded the temperature was raised to 2000° C. over a period of three hours, a stream of helium gas being continuously passed through the furnace throughout the entire firing and cooling period. It is noted that in the course of heating the above mixture to maximum temperature an exothermic reaction took place when the charge reached a temperature of around 850° C. In order to avoid undue disturbance or disruption of the charge the temperature of around 850° C. was held without rise for a short period of time until the exothermic reaction subsided after which the temperature of the reaction chamber was brought up to the maximum required temperature. The final product was a fairly coherent mass, essentially zirconium boride responding to the formula $ZrB_2$.

Although it is preferred to carry out the reaction by heating the material to a maximum of 2000° C. in order to insure thoroughness of reaction in a relatively short time, satisfactory material has been obtained by heating the mixture to a maximum temperature of around 1800° C. The product obtained by the method set forth in Example II is of slightly higher purity in respect to carbon content than that obtained by the method set forth in Example I as might be expected from the fact that the raw mixture from which the product is made contains no added carbon in uncombined form.

Example III

Titanium boride has been made from the following mixture:

| | Percent by weight |
|---|---|
| Titanium oxide | 64 |
| Boron carbide | 22 |
| Powdered carbon | 14 |

The above mixture was placed in a graphite tube after being molded into the form of small bars. The bars were surrounded by loose mix of the same composition. The resulting material was placed in a carbon tube resistance furnace and heated to a temperature of 2000° C. over a period of three hours, a stream of helium gas being continuously passed through the furnace throughout the entire firing and cooling period. The resulting product upon analysis was found to consist essentially of titanium boride responding to the formula $TiB_2$.

Other refractory or hard borides which can be made in accordance with the hereinabove described methods include such metal borides as molybdenum boride, tungsten boride, tantalum boride, hafnium boride, aluminum boride and chromium boride. However, it should be explained that in using the present methods to make these other borides the temperature in some instances should differ from the 2000° C. used in making zirconium boride and will depend upon the specific boride to be made. The maximum temperature should be slightly lower than the melting point for the boride being formed. For example, in forming molybdenum boride in accordance with the present methods the reaction temperature should be kept preferably below 1800° C. which is the approximate temperature at which molybdenum boride melts.

The present method is featured by the use of a boron compound, boron carbide, that is relatively stable and non-volatile at the high temperatures required for the formation of the metal boride, and avoids the use of volatile compounds such as boric oxide as required by certain previous methods. The method of firing the mixture or molded shape is also designed to prevent the contamination with carbon such as might be obtained when a graphite crucible or furnace lining is used in direct contact with the raw batch in making borides. The method is also featured by providing a reaction in which the carbon and oxygen contained in the original mixture combines to form a gaseous product (carbon monoxide) which passes off during the course of the reaction to promote a completing of the reaction and the formation of a final product relatively low in carbon content. The method further has the advantage of yielding a product of satisfactory purity which can be used for forming molded shapes without further purifying treatments.

Having thus described the invention it is desired to claim:

1. A method of making metal borides which comprises preparing a starting mixture of boron carbide, carbon and an oxide of the metal the boride of which is to be made, and heating said mixture in an inert atmosphere to react the ingredients of said mixture and form the desired metal boride.

2. A method of making metal borides which comprises forming a raw starting mixture comprising boron carbide, carbon and an oxide of the metal the boride of which is to be made, molding shapes therefrom, embedding said shapes in a loose mass of the same raw mixture, and heating the thusly embedded shapes in an inert atmosphere to react the ingredients thereof and form the desired metal boride.

3. A method of making zirconium boride which comprises preparing a starting mixture of boron carbide, carbon and zirconium oxide, and heating said mixture in an inert atmosphere to react the ingredients thereof and form zirconium boride.

4. A method of making zirconium boride which comprises preparing a starting mixture of boron carbide, carbon and zirconium oxide, in the stoichiometric proportions required by the equation $$2ZrO_2 + B_4C + 3C \rightarrow 2ZrB_2 + 4CO$$

and heating said mixture in an inert atmosphere to react the ingredients thereof and form zirconium boride.

5. A raw batch for the manufacture of zirconium boride consisting essentially of boron carbide, carbon and zirconia in the stoichiometric proportions required by the equation $$2ZrO_2 + B_4C + 3C \rightarrow 2ZrB_2 + 4CO$$

6. A method of making zirconium boride which comprises preparing a raw starting mixture of boron carbide, carbon and zirconium oxide, molding shapes therefrom, embedding said shapes in a loose mass of the same raw mixture, and heating the thusly embedded shapes in an inert atmosphere to react the ingredients thereof and form zirconium boride.

7. A raw batch for the manufacture of metal borides consisting essentially of boron carbide, carbon and an oxide of the metal the boride of which is to be made, said ingredients being in the stoichiometric proportions required by the equation $$M\ oxide + B_4C + C \rightarrow M\ boride + CO$$

wherein M is a metal selected from the group consisting of titanium, chromium, zirconium, molybdenum, hafnium, tantalum and tungsten.

(References on following page)

References Cited in the file of this patent

UNITED STATES PATENTS

| | | |
|---|---|---|
| 1,074,672 | Weintraub | Oct. 7, 1913 |
| 1,858,413 | Noack | May 17, 1932 |
| 1,913,373 | Golyer | June 13, 1933 |
| 2,088,838 | Coke et al. | Aug. 3, 1937 |
| 2,141,617 | Ridgway | Dec. 27, 1938 |
| 2,200,258 | Boyer | May 14, 1940 |
| 2,201,150 | Boyer | May 21, 1940 |
| 2,456,891 | Rigrod | Dec. 21, 1948 |

FOREIGN PATENTS

| | | |
|---|---|---|
| 435,754 | Great Britain | Sept. 23, 1935 |
| 440,764 | Great Britain | Jan. 6, 1936 |
| 574,170 | Great Britain | Dec. 27, 1945 |

OTHER REFERENCES

Mellor: "Comprehensive Treatise on Inorganic and Theoretical Chemistry," 1925, vol. VI, page 191; vol. 5, pages 23–33 (1924).

McKenna: "Industrial and Engineering Chemistry," vol. 28, No. 7, pages 767–772, July 1936.